_United States Patent Office_

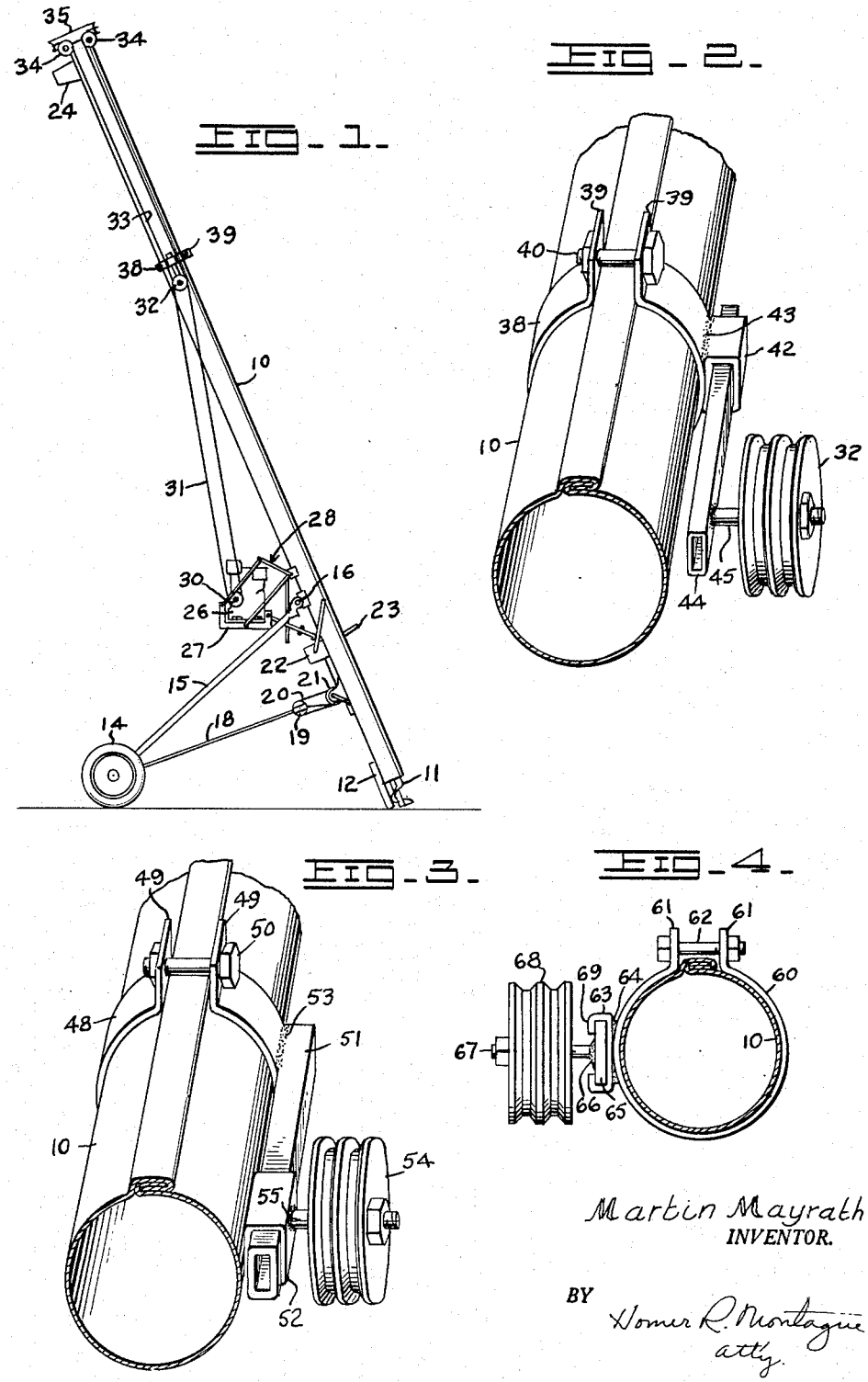

3,179,242
Patented Apr. 20, 1965

3,179,242
TRANSFER PULLEY MOUNTING FOR
CONVEYORS
Martin Mayrath, 10707 Lennox Lane, Dallas, Tex.
Filed May 15, 1961, Ser. No. 110,172
13 Claims. (Cl. 198—233)

This invention relates to an auger conveyor particularly of the elevating type, and has special reference to a transfer pulley device interposed between the motor pulley and the pulley which drives the auger.

It is the common practice in conveyors of this type to provide a motor supported by the auger tube and preferably so mounted as to remain vertical regardless of the angle of inclination of the conveyor. The auger is commonly provided at its upper end with a driving pulley, and due to the distance between the motor pulley and the conveyor pulley in many cases, it is necessary to use one or more transfer pulleys. In other words, assuming that a single transfer pulley is used, such pulley is supported by the conveyor tube and is driven by a belt from the motor pulley, and another belt extends from the transfer pulley to the conveyor pulley to drive the latter. The conveyor pulley thus is provided with two grooves, each for one of the belts referred to.

An important object of the present invention is to provide a highly simplified form of transfer pulley which readily may be mounted on the conveyor tube and which automatically adjusts itself to the proper position according to the tensioning or adjustment of the two belts.

A further object is to provide novel means for supporting the transfer pulley with respect to the auger tube so that it is freely movable longitudinally of the conveyor tube to assume automatically adjusted positions according to the tensioning of the belts.

A further object is to provide a novel support, in the form of a clamp surrounding the auger tube, and to provide the pulley with a mounting member which is adapted to slide relative to the support to move longitudinally of the conveyor tube.

A further object is to provide a device of this character which is readily reversible so as to be usable on either side of the auger tube, and which is capable of use in several forms without departing from its basic simplicity of form.

Other objects and advantages of the invention will become apparent during the course of the following description.

In the drawing there are shown three embodiments of the invention. In this showing:

FIGURE 1 is a side elevation of an auger conveyor showing one form of the invention applied to one side of the auger tube;

FIGURE 2 is a fragmentary perspective view illustrating the same form of transfer pulley device mounted on the other side of the auger tube;

FIGURE 3 is a similar view of a modified form of the invention; and

FIGURE 4 is a transverse sectional view through an auger tube showing in elevation a further modification of the invention attached thereto.

Referring to FIGURE 1, the numeral 10 designates a conveyor tube, in which is rotatable an auger 11 projecting from the lower end of the tube to pick up material to be conveyed upwardly through the tube 10. The lower end of the latter is provided with a supporting foot 12 adapted to rest on the surrounding surface to clear the lower end of the auger with respect thereto.

A wheeled carriage 14 is connected to the auger tube by radius rods 15 pivoted thereto as at 16. Inasmuch as the portion of the conveyor above the pivot 16 is longer and consequently heavier than the lower portion, the tube tends to turn in a clockwise direction about the pivot 16. Such turning movement is prevented and the angle of inclination of the tube 10 is adjusted by a suitable cable, pulley and windlass means. A cable 18 is connected to a pulley 19 and a cable 20 passes around this pulley and around a pulley 21 carried by the tube 10. From the pulley 21 the cable 20 extends to a windlass 22 of conventional type, operated by a crank 23. Operation of the windlass obviously changes the angle of the tube 10 to the vertical depending upon the desired height and point of discharge of the conveyor.

The upper end of the conveyor tube 10 is closed conventionally and a discharge spout 24 is provided in the usual manner for discharging elevated material to a bin, truck or any other receiver.

A driving motor 26 is mounted on a base 27 suitably supported with respect to the tube by lever and linkage means indicated as a whole by the numeral 28 and forming no part of the present invention. The motor supporting means is preferably of such type as to maintain the motor vertical in any tilted position of the conveyor tube. The motor supporting means may be of the type, for example, shown in the prior patent to Leon C. Wilcoxen, No. 2,751,063, granted June 19, 1956. The motor 26 is provided with a drive pulley 30 about which passes a cable 31 and this cable passes around one of the two grooves of a transfer pulley 32, forming part of the present invention. Another cable 33 passes around the second groove of the pulley 32 and upwardly around pulleys 34 which guide the cable 33 for movement around a pulley 35 carried by the upper end of the auger 11.

Referring to FIGURE 2, a clamping band 38 of the split type surrounds the tube 10 and has ears 39 through which pass a clamping bolt 40 for tightly positioning the band 38 around the tube 10. The space between the ears 39 preferably embraces the seam of the tube 10, which assists in preventing any rocking movement of the band 38 around the tube 10.

At one side, the band 38 is provided with a guide 42, preferably rectangular in cross section and firmly welded to the band 38 as at 43. A preferably hollow rectangular slide 44 is slidably mounted in the guide 42 and has welded or otherwise secured thereto a shaft 45 which rotatably supports the pulley 32. The slide 44 may be arranged at either side of the tube 10, depending upon the mounting of the motor 26, as will be apparent from FIGURES 1 and 2.

A modified form of the invention is shown in FIGURE 3 wherein the conveyor tube 10 is encircled by a band 48, similar to the band 38 and provided with ears 49 through which pass a clamping bolt 50. Instead of the guide 42 in which the slide 44 operates, the parts may be relatively reversed in FIGURE 3. In this case the device employs a guide 51 of rectangular cross section and a slide 52 surrounds the guide 50 and is movable therealong longitudinally of the tube 10. The slide 52 is preferably slightly thinner than the band 48 against which the guide 51 is welded as at 53, so as to provide clearance between the slide 52 and the tube 10. A two-grooved pulley 54, identical with the pulley 32, is mounted on a shaft 55 welded to the slide 52.

A further modification of the invention is shown in FIGURE 4 in which a band 60 surrounds the tube 10 and is provided with clamping ears 61 through which passes a bolt 62. A guide 63 is welded as at 64 to the tube 10. In this case a rigid flat slide 65 is movable in the guide 63 longitudinally of the tube 10 and has welded thereto as at 66 a shaft 67 carrying a pulley 68 having two grooves, similar to the pulleys 32 and 54. The guide 63 and slide 65 may be of any desired relative lengths to provide for necessary movement of the pulley 68 longitudinally of the tube 10, and the guide 63 is provided at the side thereof adjacent the pulley 68 with spaced inwardly turned flanges 69 between which the adjacent end of the shaft 67 moves.

Operation

The operation of the conveyor as a whole will be obvious to those familiar with such mechanisms. The lower end of the conveyor picks up material such as grain or the like and conveys it upwardly by means of the auger 11 for discharge through the spout 24 into any desired receiver. The angle of inclination of the tube 10 is adjusted by operation of the windlass 22 through its crank 23, and the motor supporting means 28 is of such nature as to maintain the motor approximately vertical in any angular position of the conveyor tube 10.

Operation of the motor 26, through the pulley 30, and belt 31, drives the pulley 32, thus transmitting power through the belt 33 and around the pulleys 34 to rotate the pulley 35 and thus drive the conveyor.

The transfer pulley 32 is freely movable longitudinally of the tube 10 and is automatically kept in proper position relative to the belts 31 and 33 by the tensioning of these members. For example, if the belt 31 should be tighter than the belt 33, the pulley 32 will shift downwardly to a slight extent, the slide 44 moving longitudinally of the tube 10 in the guide 42. Thus it will be apparent that the pulley 32 is capable of movement of the type referred to, to assume its proper position incident to the slacking of either belt, the adjustment of belt tension and to compensate for belt stretch.

The form of the invention shown in FIGURE 3 operates in exactly the same manner, the slide 52 being movable along the guide 51 to compensate for any difference in the tensioning of the belts 31 and 33. The same is true of the form of the invention in FIGURE 4, the flat slide 65 moving in the guide 63 longitudinally of the conveyor tube 10.

Any form of the invention may be arranged at either side of the tube 10. Moreover, according to the positioning of the clamping band 38 along the tube 10, the slide 44 may project longitudinally in either direction from the guide 42. For example, if it is desired to arrange the band 38 at a lower point on the tube 10 than is shown in FIGURE 1, or if a shorter belt 33 and longer belt 31 are used, the slide 44 may project upwardly from the guide 42 thus arranging the pulley 32 at a proper height.

The form of the invention shown in FIGURE 3 also can be used at either side of the tube 10. If used at the right side as viewed in FIGURE 3, the guide 51 will project downwardly. If used at the left side of the tube, the guide 51 will project upwardly, in which case the band 48 usually will be clamped to the tube 10 at a lower point. The form of the invention shown in FIGURE 4 may be clamped to either side of the tube without change, the clamp 60 merely being attached to the tube at such a point that the pulley 68 will be properly positioned where it will be efficiently guided through maximum possible distances of movement longitudinally of the tube 10.

Each form of the invention is highly simplified and may be readily attached to the tube merely by slipping the clamping band around the tube at the proper point and tightening the bolt passing through the clamping ears of the band. Each form of the invention provides a pulley which is adapted to float longitudinally of the conveyor tube to be self-adjusting to a position in which it compensates for any difference in the tensioning of the belts associated therewith.

It is to be understood that the forms of the invention shown and described are to be taken as preferred examples of the same and that various changes in the shape, size, and arrangement of the parts may be made as do not depart from the spirit of the invention or the scope of the appended claims.

What is claimed is:

1. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, a single slide to which said axle is fixed, and means for supporting said slide for free movment generally toward and away from said driving and driven pulleys solely in response to belt tension forces, whereby said transfer pulley is movable to automatically compensate for variations in the tensioning of the two belts, said slide and said means having corresponding uniformly polygonal portions slidably engaging each other to guide said slide in said movement thereof.

2. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, a single slide to which said axle is fixed, a support, and a guide slidably receiving said slide for free movement generally toward and away from said driving and driven pulleys solely in response to belt tension forces whereby said transfer pulley is movable to compensate for differences in the tensioning of the two belts, said slide and said guide having correspondingly uniformly polygonal portions slidably engaging each other and forming the sole means for guiding said slide in said movement thereof.

3. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, a single slide to which said axle is fixed, an elongated member by which said driving and driven pulleys are adapted to be supported, a support carried by said elongated member, and a guide carried by said support laterally outwardly of said elongated member and in which said slide is freely movable longitudinally of said elongated member solely in response to belt tension forces, whereby said transfer pulley is movable to compensate for differences in the tensioning of the two belts, said slide and said guide having correspondingly uniformly polygonal portions slidably engaging each other and forming the sole means for guiding said slide in said movement thereof.

4. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, a single slide to which said axle is fixed, an elongated member by which said driving and driven pulleys are supported at points remote from said transfer pulley at opposite sides thereof, a relatively rigid clamp encircling said elongated member, and a guide fixed to said clamp and in which said slide is freely movable longitudinally of said elongated member solely in response to belt tension forces, whereby said transfer pulley is movable to compensate for differences in the tensioning of the two belts, said slide and said guide having correspondingly uniformly polygonal portions slidably engaging each other and forming the sole means for guiding said slide in said movement thereof.

5. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, a single slide of polygonal cross section to which said axle is fixed, and a guide having an opening therethrough corresponding in cross sectional shape to and freely slidably receiving and forming the sole means for guiding said slide for movement thereof generally toward and away from said driving and driven pulleys solely in response to belt tension forces, whereby said pulley is movable to automatically compensate for variations in the tensioning of the two belts.

6. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, a single slide of polygonal cross section to which said axle is fixed, an elongated member by which said driving and driven pulleys are adapted to be supported, a support carried by said elongated member, and a guide carried by said support laterally outwardly of said elongated member and having an opening therethrough corresponding in cross sectional shape to the cross sectional shape of said slide and through which the latter is freely slidable longitudinally of said elongated member solely in response to belt tension forces, whereby said transfer pulley is movable to automatically compensate for variations in the tensioning of the two belts, said guide opening forming the sole means for guiding said slide in such sliding movement.

7. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, an elongated member by which said driving and driven pulleys are adapted to be supported, a support carried by said elongated member, a guide of polygonal cross section fixed to said support and elongated longitudinally of said elongated member, and a slide to which said axle is fixed and provided with an opening therethrough having a cross sectional shape corresponding to that of said guide to slide freely thereon longitudinally of said elongated member solely in response to belt tension forces, whereby said transfer pulley is movable to automatically compensate for variations in the tensioning of the two belts.

8. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, an elongated member by which said driving and driven pulleys are adapted to be supported, a support carried by said elongated member, a clamp surrounding said elongated member, a guide elongated longitudinally of said elongated member and fixed at one end thereto, said guide being of polygonal cross sectional shape, and a slide to which said axle is fixed, said slide having an opening therethrough corresponding in cross sectional shape to that of said guide to be freely slidable therealong solely in response to belt tension forces, whereby said transfer pulley is movable to automatically compensate for variations in the tensioning of the two belts.

9. A transfer pulley device for transferring power from a driving pulley to a driven pulley, a transfer pulley having two grooves around one of which is adapted to pass a belt from the driving pulley and around the other of which is adapted to pass a belt extending to the driven pulley, an axle on which said transfer pulley is mounted, an elongated member by which said driving and driven pulleys are adapted to be supported, a substantially C-shaped guide carried by said elongated member and elongated longitudinally thereof, and a plate freely slidable in said guide and to which one end of said axle is fixed, said guide having an open side defined by flanges between which said axle is freely movable longitudinally of said elongated member solely in response to belt tension forces, whereby said transfer pulley is adapted to automatically compensate for variations in the tensioning of the two belts.

10. In combination with an auger conveyor having an elongated tube and an auger therein provided at one end with a driven pulley, a motor substantially spaced from said one end of said auger and provided with a driving pulley, a transfer pulley intermediate said driving and driven pulleys and provided with a pair of grooves, a belt passing around said driving pulley and around one of said grooves, a second belt passing around said driven pulley and around the other of said grooves, said transfer pulley being arranged adjacent one side of said tube, and means carried by said tube for supporting said transfer pulley for free movement longitudinally of said tube solely in response to belt tension forces, to compensate for variations in the tensioning of said belts.

11. In combination with an auger conveyor having an elongated tube and an auger therein provided at one end with a driven pulley, a motor substantially spaced from said one end of said auger and provided with a driving pulley, a transfer pulley intermediate said driving and driven pulleys and provided with a pair of grooves, a belt passing around said driving pulley and around one of said grooves, a second belt passing around said driven pulley and around the other of said grooves, said transfer pulley being arranged adjacent one side of said tube, an axle on which said transfer pulley is mounted to rotate, a slide to which solely one end of said axle is fixed, and a guide carried by said tube for supporting said slide for free movement longitudinally of said tube solely in response to belt tension forces, whereby said transfer pulley is movable longitudinally of said tube to compensate for variations in the tensioning of said belts.

12. In combination with an auger conveyor having an elongated tube and an auger therein provided at one end with a driven pulley, a motor substantially spaced from said one end of said auger and provided with a driving pulley, a transfer pulley intermediate said driving and driven pulleys and provided with a pair of grooves, a belt passing around said driving pulley and around one of said grooves, a second belt passing around said driven pulley and around the other of said grooves, said transfer pulley being arranged adjacent one side of said tube, an axle on which said transfer pulley is mounted to rotate, a slide to which solely one end of said axle is fixed, a clamp carried by said tube, and a guide fixed to said clamp and slidably receiving said slide for free longitudinal movement relative to said tube solely in response to belt tension forces, whereby said transfer pulley is movable longitudinally of said tube to compensate for variations in the tensioning of the two belts.

13. In combination with an auger conveyor having an elongated tube and an auger therein provided at one end with a driven pulley, a motor substantially spaced from said one end of said auger and provided with a driving pulley, a transfer pulley intermediate said driving and driven pulleys and provided with a pair of grooves, a belt passing around said driving pulley and around one of said grooves, a second belt passing around said driven pulley and around the other of said grooves, said transfer pulley being arranged adjacent one side of said tube, an axle on which said transfer pulley is mounted to rotate, a slide to which solely one end of said axle is fixed, said tube having a seam projecting outwardly thereof, a split clamp surrounding said tube and having ears projecting outwardly of said tube at opposite sides of said seam, a bolt passing through said ears, and a guide carried by said clamp and in which said slide is freely movable longitudinally of said tube solely in response to belt tension forces, whereby said transfer pulley is movable to automatically compensate for variations in the tensioning of the two belts.

References Cited by the Examiner
UNITED STATES PATENTS

| | | | |
|---|---|---|---|
| 1,441,137 | 1/23 | Wall | 198—208 |
| 2,457,458 | 12/48 | Girod | 74—242.14 |
| 2,605,885 | 8/52 | Baldwin | 198—233 |
| 2,751,063 | 8/54 | Wilcoxen | 148—203 |

SAMUEL F. COLEMAN, *Acting Primary Examiner.*
WILLIAM B. LA BORDE, *Examiner.*